United States Patent
Kim (10) Patent No.: US 9,214,698 B2
(45) Date of Patent: Dec. 15, 2015

(54) SECONDARY BATTERY INCLUDING A FIXING PART ON THE INSIDE OF THE CAN WITH A DEFINED DISTANCE BETWEEN THE FIXING PART AND THE ELECTRODE ASSEMBLY

(75) Inventor: Dae-Kyu Kim, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 525 days.

(21) Appl. No.: 12/845,633

(22) Filed: Jul. 28, 2010

(65) Prior Publication Data

US 2011/0076548 A1     Mar. 31, 2011

(30) Foreign Application Priority Data

Sep. 29, 2009   (KR) .......................... 10-2009-0092606

(51) Int. Cl.
H01M 2/02       (2006.01)
H01M 2/34       (2006.01)
H01M 10/052     (2010.01)
H01M 2/10       (2006.01)
H01M 10/0587    (2010.01)

(52) U.S. Cl.
CPC ............ *H01M 10/052* (2013.01); *H01M 2/023* (2013.01); *H01M 2/0267* (2013.01); *H01M 2/0275* (2013.01); *H01M 2/1094* (2013.01); *H01M 2/347* (2013.01); *H01M 10/0587* (2013.01); *H01M 2002/0297* (2013.01); *Y02E 60/122* (2013.01); *Y02T 10/7011* (2013.01)

(58) Field of Classification Search
CPC . H01M 2/023; H01M 2/0267; H01M 2/0275; H01M 2/1094; H01M 2/347; H01M 10/052; H01M 10/0587

USPC .......................................................... 429/163
See application file for complete search history.

(56) References Cited

U.S. PATENT DOCUMENTS

| | | | |
|---|---|---|---|
| 6,686,087 B2 * | 2/2004 | Fujita et al. | ...................... 429/94 |
| 2003/0113616 A1 * | 6/2003 | Kasuga et al. | .................. 429/94 |
| 2009/0087732 A1 | 4/2009 | Kim | |
| 2010/0099023 A1 | 4/2010 | Kuroda et al. | |

(Continued)

FOREIGN PATENT DOCUMENTS

| | | |
|---|---|---|
| CN | 101399369 A | 4/2009 |
| CN | 101529641 A | 9/2009 |

(Continued)

OTHER PUBLICATIONS

Chung, H., Machine translation of KR 2008-037863 A, May 2008.*

(Continued)

*Primary Examiner* — Sean P Cullen
(74) *Attorney, Agent, or Firm* — Knobbe, Martens, Olson & Bear, LLP (57) ABSTRACT

A secondary battery including a fixing part on the inside of the can is disclosed. In one embodiment, the battery includes an electrode assembly having a diameter of L2, a can housing the electrode assembly and at least one fixing portion extending from an inner wall of the can toward an outer surface of the electrode assembly. In one embodiment, L1 is defined as the shortest distance between two portions of the inner wall of the can which are substantially directly opposing with respect to each other. The electrode assembly is separated from the fixing part by a gap such that the electrode assembly is prevented from contacting the can.

16 Claims, 10 Drawing Sheets

(56) References Cited

U.S. PATENT DOCUMENTS

| | | |
|---|---|---|
| 2011/0076533 A1* | 3/2011 | Choi .............................. 429/94 |
| 2012/0060361 A1 | 3/2012 | Reis |

FOREIGN PATENT DOCUMENTS

| | | | |
|---|---|---|---|
| JP | 9-293529 A | | 11/1997 |
| JP | 09293529 A | * | 11/1997 |
| JP | 10-199493 A | | 7/1998 |
| JP | 10-247522 A | | 9/1998 |
| JP | 11224693 A | * | 8/1999 |
| JP | 2001057179 A | * | 2/2001 |
| JP | 2001-068166 A | | 3/2001 |
| JP | 2003-257494 A | | 9/2003 |
| JP | 2007-073523 A | | 3/2007 |
| JP | 2008-091252 A | | 4/2008 |
| JP | 2008-108457 A | | 5/2008 |
| JP | 2008-262788 A | | 10/2008 |
| KR | 10-2006-0061079 | | 6/2006 |
| KR | 10-2007-0097852 | | 10/2007 |
| KR | 10-2008-0037863 | | 5/2008 |
| KR | 10-2009-0032272 A | | 4/2009 |
| WO | WO 2008/050211 A1 | | 5/2008 |

OTHER PUBLICATIONS

Yamamoto et al., Machine translation of JP 09-293529 A, Nov. 1997.*

Komori et al., Machine translation of JP 11-224693 A, Aug. 1999.*

"Fix." Merriam-Webster.com. Merriam-Webster, n.d. Web. Jun. 5, 2014. <http://www.merriam-webster.com/dictionary/fix>.*

Kageyama, M., Machine translation of JP 2001-057179 A, Feb. 2001.*

European Search Report dated Jan. 18, 2011 for European Patent Application No. EP10251651.5 corresponding to Korean Patent Application No. KR 10-2009-0092606 which corresponds to the captioned Application.

Korean Office Action dated Jun. 30, 2011 for Korean Application No. KR 10-2009-0092606 which corresponds to captioned U.S. Appl. No. 12/845,633.

Korean Office Action dated Jun. 30, 2011 for Korean Application No. KR 10-2009-0082371 corresponding to U.S. Appl. No. 12/874,128, which is related to captioned U.S. Appl. No. 12/845,633.

Japanese Office Action dated Sep. 4, 2012 for Japanese Patent Application No. JP 2010-031432 which shares priority of Korean Patent Application No. KR 10-2009-0092606 with captioned U.S. Appl. No. 12/845,633.

Office Action dated Oct. 10, 2012 for U.S. Appl. No. 12/874,128, filed Sep. 1, 2010, which is related to captioned U.S. Appl. No. 12/845,633.

Office Action dated Jan. 17, 2013 for U.S. Appl. No. 12/874,128, filed Sep. 1, 2010, which is related to captioned U.S. Appl. No. 12/845,633.

Chinese Office Action dated Dec. 14, 2012 for Chinese Patent Application No. CN 201010266956.8 which shares priority of Korean Patent Application No. KR 10-2009-0092606 with captioned U.S. Appl. No. 12/845,633.

Chinese Office Action dated Aug. 2, 2013 for Chinese Patent Application No. CN 201010266956.8 which shares priority of Korean Patent Application No. KR 10-2009-0092606, filed Sep. 29, 2009, with captioned U.S. Appl. No. 12/845,633.

Office Action dated Feb. 24, 2014 for U.S. Appl. No. 12/874,128, filed Sep. 1, 2010, which is related to captioned U.S. Appl. No. 12/845,633.

European Examination Report dated Dec. 1, 2014 for European Patent Application No. EP 10 251 651.5 which shares priority of Korean Patent Application No. KR 10-2009-0092606 with captioned U.S. Appl. No. 12/845,633.

* cited by examiner

SECONDARY BATTERY INCLUDING A FIXING PART ON THE INSIDE OF THE CAN WITH A DEFINED DISTANCE BETWEEN THE FIXING PART AND THE ELECTRODE ASSEMBLY

CROSS-REFERENCE TO RELATED APPLICATION

This application claims the benefit of Korean Patent Application No. 2009-92606, filed Sep. 29, 2009, the disclosure of which is hereby incorporated herein by reference in its entirety.

BACKGROUND OF THE INVENTION

1. Field of the Invention

The present invention relates to a secondary battery, and more particularly, to a secondary battery which can prevent movement of an electrode assembly housed in a can to improve safety.

2. Description of the Related Technology

Secondary batteries are rechargeable and thus repeatedly used, so that they have been widely used as energy sources of electronic devices in various fields.

While the secondary batteries have been generally used in compact electronic devices such as MP3 players, cameras and PMPs due to small capacity, as high-capacity and high-output batteries can be manufactured, the secondary batteries are being manufactured to be used in hybrid cars, electricity-generating devices and so forth on a commercial level.

SUMMARY OF CERTAIN INVENTIVE ASPECTS

One aspect of the present invention is a secondary battery, which has a fixing part formed on an inner wall of a can to optimize a gap between the inner wall of the can and an outer wall of an electrode assembly so that an electrode plate has no defect, and movement of the electrode assembly is effectively prevented to improve safety.

Another aspect of the present invention is a secondary battery which includes an electrode assembly and a can housing the electrode assembly, in which the can has a fixing part on an inner wall thereof. Here, a value obtained by subtracting a diameter of the electrode assembly from a gap between facing points of the inner wall of the can ranges from −0.12 to 0.10 mm.

Another aspect of the present invention is a secondary battery which includes an electrode assembly and a can housing the electrode assembly, in which the can has at least one fixing parts on an inner wall of the can. Here, a sum of gaps between an inner wall of the fixing part and an outer wall of the electrode assembly, or a sum of a gap between an inner wall of the fixing part and an outer wall of the electrode assembly and a gap between an inner wall of the can and an outer wall of the electrode assembly ranges from about −0.12 mm to about 0.10 mm.

Here, when there are one or more pairs of the fixing parts which face each other, the gaps between the inner wall of the fixing part and the outer wall of the electrode assembly may range from about −0.12 mm to about 0.10 mm.

When there is one fixing part, the sum of the gap between the inner wall of the can and the outer wall of the electrode assembly and the gap between the inner wall of the can which does not have the fixing part and the outer wall of the electrode assembly may range from about −0.12 mm to about 0.10 mm.

At least one fixing part may be formed in a length direction or along a circumference of the can.

The fixing part may be made of a metal or rubber.

The fixing part may be formed to correspond to the outer wall of the electrode assembly.

The fixing part may be formed to correspond to at least one of upper, middle and lower portions of the electrode assembly.

The fixing part may have a polygonal or semi-circular cross-section.

The fixing part may be formed in such a manner that a part of the inner wall of the can extends or a separate component is attached to the inner wall of the can.

Another aspect is a secondary battery comprising: an electrode assembly having a diameter of L2; a can housing the electrode assembly; and at least one fixing portion extending from an inner wall of the can toward an outer surface of the electrode assembly, wherein L1 is defined as the shortest distance between two portions of the inner wall of the can which are substantially directly opposing with respect to each other; wherein the distance of L2 subtracted from L1 is in the range from about −0.12 mm to about 0.10 mm.

In the above battery, the fixing part is integrally formed into the inner wall of the can or is a separate component attached to the inner wall of the can. In the above battery, the fixing part is formed of a metal or rubber. In the above battery, the fixing part is substantially continuously formed along a circumference of the can. In the above battery, the fixing part has a polygonal or semi-circular cross-section. In the above battery, the electrode assembly has a first height measured from the bottom of the can to the top of the can, wherein the fixing part has a second height measured from the bottom of the can to the top of the can, and wherein the second height is equal to or greater than the first height.

In the above battery, the electrode assembly has a first height measured from the bottom of the can to the top of the can, wherein the fixing part has a second height measured from the bottom of the can to the top of the can, wherein the second height is less than the first height, wherein the fixing part is formed on at least one of upper, middle and lower portions of the inner wall of the can, and wherein the upper portion is closer to the top of the can than the lower portion. In the above battery, the fixing part comprises at least one pair of sub-fixing portions substantially directly opposing each other, and wherein the shortest distance (L1) is defined as the distance between the pair of sub-fixing portions.

In the above battery, the fixing part comprises first and second pairs of sub-fixing portions, wherein the first pair of sub-fixing portions are substantially directly opposing with respect to each other, wherein the second pair of sub-fixing portions are substantially directly opposing with respect to each other, and wherein the distance between the first pair of sub-fixing portions is different from the distance between the second pair of sub-fixing portions. In the above battery, the fixing part is one in number, and wherein the shortest distance (L1) is defined as the distance between the fixing part and the portion of the inner wall which is substantially directly opposing the one fixing part.

Another aspect is a secondary battery comprising: an electrode assembly comprising an outer surface, wherein the electrode assembly has a diameter of L2; a can housing the electrode assembly, wherein the can comprises an inner wall facing the outer surface of the electrode assembly; and at least one protrusion extending from the inner wall of the can toward the outer surface of the electrode assembly, wherein the protrusion comprises i) a bottom portion contacting the inner wall of the can and ii) a top portion which faces and is closer to the outer surface of the electrode assembly than the bottom portion, wherein L1 is defined as the shortest distance between two portions of the inner wall of the can which are substantially directly opposing with respect to each other, and wherein the distance of L2 subtracted from L1 is in the range from about −0.12 mm to about 0.10 mm.

In the above battery, the protrusion comprises a pair of sub-protrusions which are substantially directly opposing with respect to each other, wherein L3 is defined as the shortest distance between the outer surface of the electrode assembly and the top portion of one of the two sub-protrusions, wherein L4 is defined as the shortest distance between the outer surface of the electrode assembly and the top portion of the other sub-protrusion, and wherein the sum of L3 and L4 is in the range from about −0.12 mm to about 0.10 mm. In the above battery, the protrusion is one in number, wherein L3 is defined as the shortest distance between the outer surface of the electrode assembly and the top portion of the one protrusion, wherein L4 is defined as the shortest distance between the outer surface of the electrode assembly and the portion of the inner wall of the can which is substantially directly opposing the one protrusion, and wherein the sum of L3 and L4 is in the range from about −0.12 mm to about 0.10 mm.

In the above battery, the protrusion is substantially continuously formed along a circumference of the can. In the above battery, the protrusion is formed of a metal or rubber. In the above battery, the electrode assembly has a first height measured from the bottom of the can to the top of the can, wherein the protrusion has a second height measured from the bottom of the can to the top of the can, and wherein the second height is equal to or greater than the first height. In the above battery, the electrode assembly has a first height measured from the bottom of the can to the top of the can, wherein the protrusion has a second height measured from the bottom of the can to the top of the can, wherein the second height is less than the first height, wherein the protrusion is formed on at least one of upper, middle and lower portions of the inner wall of the can, and wherein the upper portion is closer to the top of the can than the lower portion. In the above battery, the protrusion has a polygonal or semi-circular cross-section.

In the above battery, the protrusion is integrally formed into the inner wall of the can or is a separate component attached to the inner wall of the can. In the above battery, the protrusion comprises first and second pairs of sub-protrusions, wherein the first pair of sub-protrusions are substantially directly opposing with respect to each other, wherein the second pair of sub-protrusions are substantially directly opposing with respect to each other, and wherein the distance between the first pair of sub-protrusions is different from the distance between the second pair of sub-protrusions.

DETAILED DESCRIPTION OF CERTAIN INVENTIVE EMBODIMENTS

Among secondary batteries, a lithium secondary battery is widely used due to a high operating voltage and a high energy density per unit weight. The lithium secondary battery is generally formed by housing an electrode assembly and an electrolyte in an outer case, and sealing the outer case. The lithium secondary battery may be classified into a can type and a pouch type according to the shape of the outer case, and the can type may be classified into a cylindrical shape and a prismatic shape.

The cylindrical secondary battery is generally formed by housing an electrode assembly and an electrolyte in a can, and inserting an insulating gasket and a cap assembly into an opening of the can to seal the can.

The cylindrical secondary battery may be formed by inserting the insulating gasket into the opening of the can, inserting components of the cap assembly into the insulating gasket, and crimping a side of the can and the insulating gasket to seal the can.

When the electrode assembly is housed in the can, a predetermined space may be provided between an outer wall of the electrode assembly and an inner wall of the can to prevent damage to the electrode assembly due to a contact with the can.

As described above, since the electrode assembly is housed in the can but not fixed into the can, if the space between the inner wall of the can and the outer wall of the electrode assembly is large, the electrode assembly may be easily moved during application of an external impact. Due to the movement of the electrode assembly, an attached electrode tab may be detached, or a crack may be generated in the electrode tab. Thus, it is difficult to ensure safety.

Embodiments of the present invention will be described more fully with reference to accompanying drawings. Moreover, in the drawings, the length and thickness of an element or a region may be exaggerated for clarity. Also, like numerals denote like elements throughout the specification. A part is "connected" with another part, which means that these are "directly connected", or "electrically connected" with each other having a third device therebetween.

Figure 1:
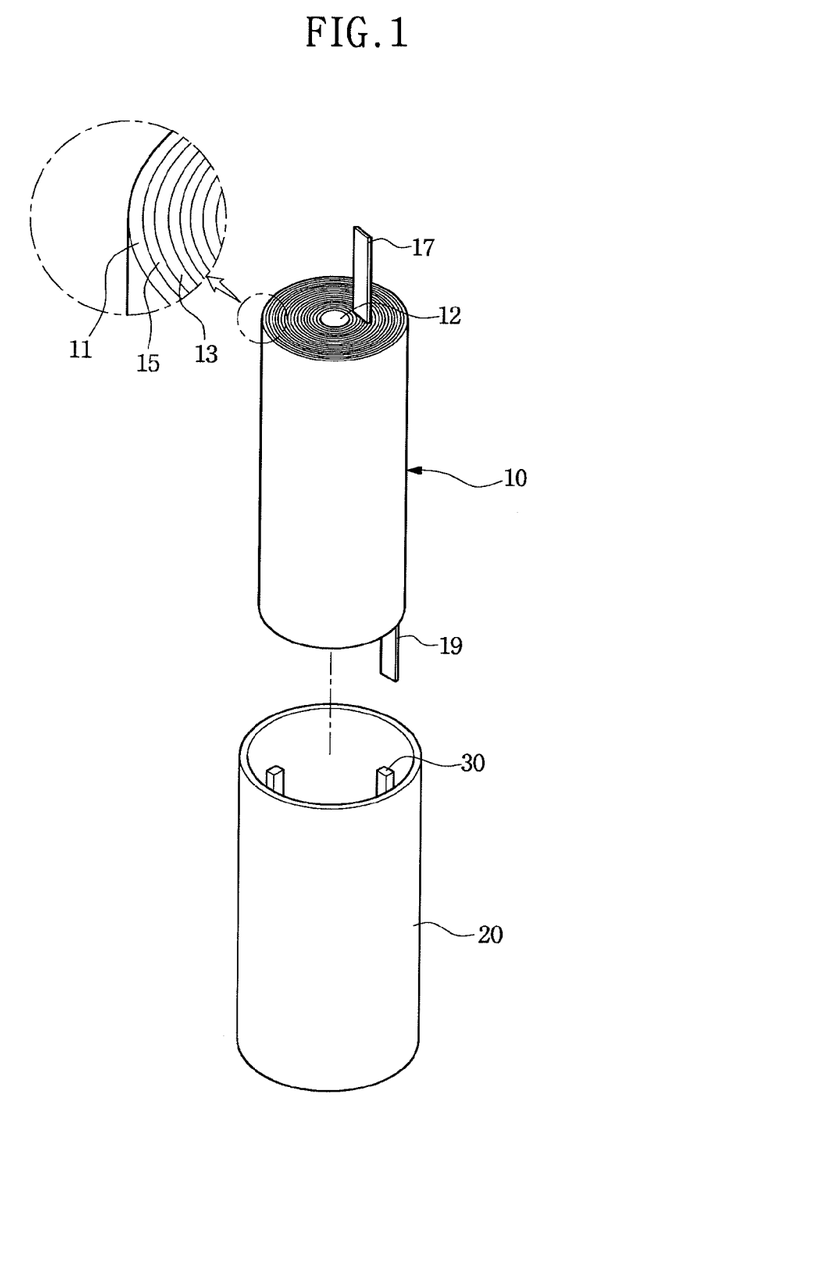
FIG. 1 is an exploded perspective view of a secondary battery according to an exemplary embodiment of the present invention.

In one embodiment, as shown in FIG. 1, a secondary battery 1 includes an electrode assembly 10, a can 20 housing the electrode assembly 10, and a fixing part (or protrusion) 30 formed on an inner wall of the can 20. The fixing part 30 will be described in further detail with reference to FIGS. 2 to 5F.

In one embodiment, the electrode assembly 10 includes a first electrode plate 11 and a second electrode plate 13, which have different polarities from each other, and a separator 15 disposed between the two electrode plates 11 and 13 to prevent a short circuit between the two electrode plates 11 and 13.

The electrode assembly 10 may be formed in a jelly-roll shape, which is formed by stacking and winding the first electrode plate 11, the second electrode plate 13 and the separator 15.

In one embodiment, the electrode assembly 10 is formed in a cylindrical shape, and has a center hollow 12 in a middle of the electrode assembly 10.

Here, a component disposed at the outermost of the electrode assembly 10 formed in the jelly-roll shape is not limited, and thus a finish tape, which is not shown in FIG. 1, may be attached to an outer wall of the electrode assembly 10 to prevent unwinding of an outer end of the electrode assembly 10.

The first and second electrode plates 11 and 13 may be formed by applying a positive or negative electrode active material slurry to a collector made of aluminum or copper.

A positive electrode plate may be formed by applying the positive electrode active material slurry to the collector made of aluminum, and a negative electrode plate may be formed by applying the negative electrode active material slurry to the collector made of copper.

The first and second electrode plates 11 and 13 may include non-coating portions, respectively, through which the collector is exposed since no active material slurry is applied thereon. First and second electrode tabs 17 and 19 may be electrically connected to the non-coating portions, respectively.

In one embodiment, the first electrode tab 17 is connected to the non-coating portion formed on the first electrode plate 11, and the second electrode tab 19 is connected to the second electrode plate 13.

One of the first and second electrode tabs 17 and 19 may be led upward from the electrode assembly 10 toward an opening of the can 20, and the other may be led downward from the electrode assembly 10 toward a bottom of the can 20.

In one embodiment, the first and second electrode tabs 17 and 19 may be led in substantially the same direction as each other.

In one embodiment, the first electrode tab 17 is led upward from the electrode assembly 10, and the second electrode tab 19 is led downward from the electrode assembly 10.

The can 20 may be formed of a metal such as aluminum or stainless steel, and formed in a cylindrical shape having an opening at one end to house the electrode assembly 10. The electrode assembly 10 may be inserted into the can 20 through the opening.

As not shown in the drawings, the secondary battery 1 may include a cap assembly to seal the can 20. Between the opening of the can 20 and the cap assembly, an insulating gasket may be interposed to prevent a short circuit between the can 20 and the cap assembly.

In one embodiment, the cap assembly is connected to the opening of the can 20 to seal the can 20, and interrupts current flow when an internal pressure of the can 20 is more than a predetermined level, thereby improving safety of the secondary battery.

Figure 2:
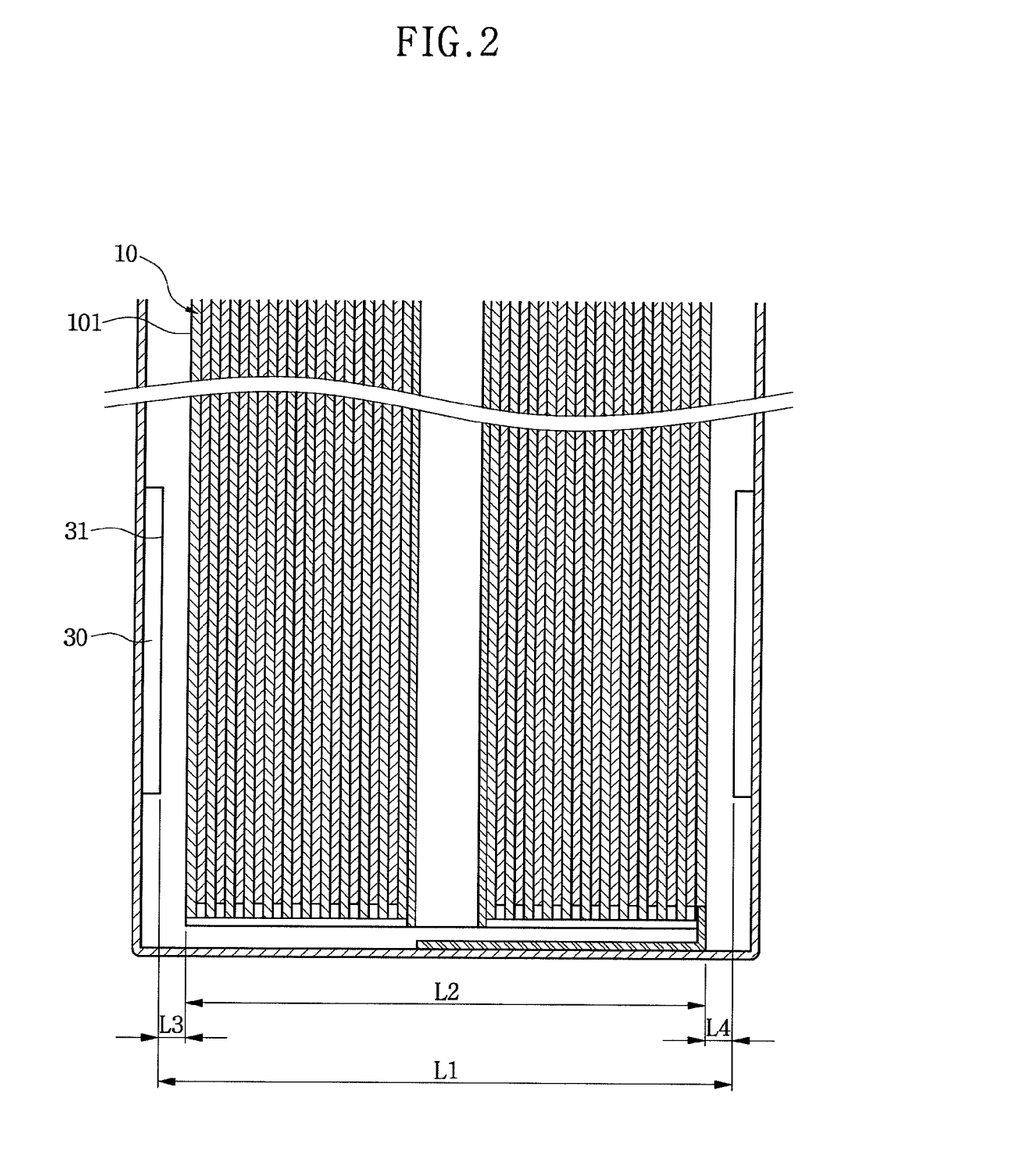
FIG. 2 is a cross-sectional view of a part of the secondary battery according to the exemplary embodiment of the present invention.
Figure 3:
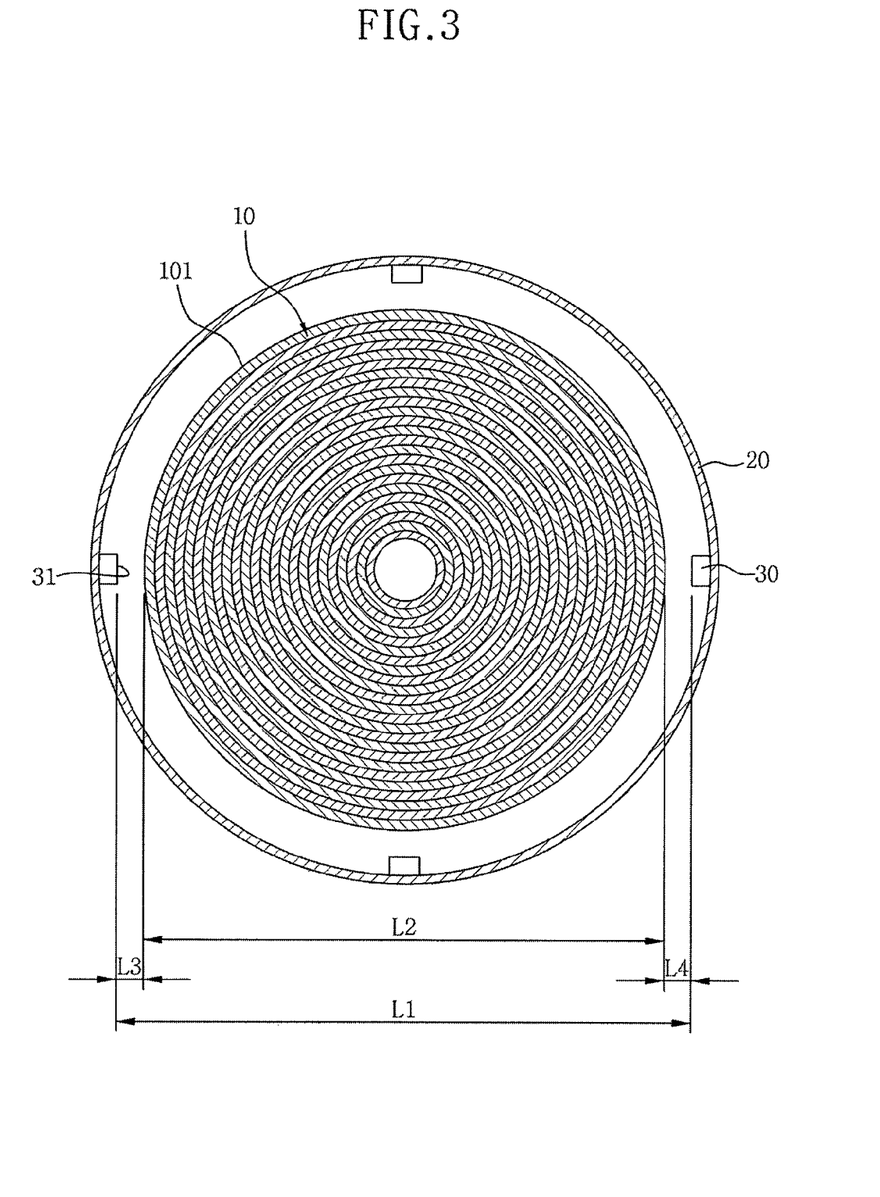
FIG. 3 is a plan view for the cross-sectional view of FIG. 2.

In addition, the secondary battery 1 may include insulating plates disposed on and under the electrode assembly to prevent a short circuit between the electrode assembly 10 and the can and reduce an external impact, and a center pin disposed in the center hollow of the electrode assembly to prevent deformation of the electrode assembly and exhaust an internal gas generated from the electrode assembly. In one embodiment, as shown in FIGS. 2 and 3, the secondary battery 1 includes a fixing part 30 formed in the can 20. For convenience of description, four fixing parts 30 are illustrated. The four fixing parts 30 may be separately formed in pairs to face each other. The four fixing parts 30 may include first and second pairs of sub-fixing portions (or sub-protrusions) each pair substantially directly opposing with respect to each other. The distance between the first pair of sub-fixing portions may be the same as or different from the distance between the second pair of sub-fixing portions.

The electrode assembly 10 may be disposed in the middle of the can 20. However, the present invention is not limited thereto.

The fixing part 30 may be integrally formed into the inner wall of the can 20, or may be formed by attaching a separate component to the inner wall of the can 20.

When the fixing part 30 is formed by attaching a separate component to the inner wall of the can 20, it may be made of a metal, especially, aluminum or stainless steel, which is the same as the material for the can 20, or rubber.

When the fixing part 30 is integrated with the can 20, it is not necessary to have an additional process to attach the fixing part 30, and if the fixing part 30 is made of rubber, it can reduce an external impact.

In the cross-sectional view as shown in FIGS. 2 and 3, L1 denotes a gap between inner walls (or top portions) of the facing fixing parts 30, L2 denotes a diameter of the electrode assembly 10. L1 may be defined as the shortest distance between two portions of the inner wall of the can 20 which are substantially directly opposing with respect to each other, regardless of whether one of the two portions is a fixing part or not. L3 and L4 denote gaps between the inner walls 31 of the facing fixing parts 30 and an outer wall 101 of the electrode assembly 10, respectively. Here, L1-L2 denoting a value obtained by subtracting the diameter L2 of the electrode assembly from the gap L1 between the inner walls of the facing fixing parts 30 may be maintained in the range of about −0.12 mm to about 0.10 mm. Here, the symbol "−" means that a part of the electrode assembly 10 is recessed due to pressure given by the fixing part 30.

In one embodiment, the electrode assembly 10 is disposed in the middle of the can 20, and thus each of the gaps L3 and L4 between the inner walls 31 of the facing fixing parts 30 and the outer wall 101 of the electrode assembly 10 is the same as (L1−L2)/2.

In one embodiment, in the cross-sectional view, the sum of both the gaps L3 and L4 between the inner walls 31 of the facing fixing parts 30 formed in the can 20 and the outer wall 101 of the electrode assembly 10 may range from about −0.12 mm to about 0.10 mm.

Table 1 shows whether or not a defect is generated from the electrode tab and the electrode plates after a drum test is carried out while changing the gap L1 between the inner walls of the facing fixing parts and the diameter L2 of the electrode assembly.

TABLE 1

| | Gap between inner walls of facing fixing parts (L1, mm) | Diameter of J/R (L2, mm) | L1 − L2 (mm) | Drum Test (Electrode tab) | | | Defect on electrode plate |
|---|---|---|---|---|---|---|---|
| C. example 1 | 17.30 | 17.05 | 0.25 | yes | yes | yes | no |
| C. example 2 | 17.27 | 17.08 | 0.19 | no | yes | yes | no |
| C. example 3 | 17.20 | 17.08 | 0.12 | no | no | yes | no |
| E. example 1 | 17.17 | 17.07 | 0.10 | no | no | no | no |
| E. example 2 | 17.33 | 17.23 | 1.10 | no | no | no | no |
| E. example 3 | 17.31 | 17.22 | 0.09 | no | no | no | no |
| E. example 4 | 17.36 | 17.30 | 0.06 | no | no | no | no |
| E. example 5 | 17.06 | 17.01 | 0.05 | no | no | no | no |
| E. example 6 | 17.17 | 17.13 | 0.04 | no | no | no | no |
| E. example 7 | 17.26 | 17.23 | 0.03 | no | no | no | no |
| E. example 8 | 17.24 | 17.22 | 0.02 | no | no | no | no |
| E. example 9 | 17.10 | 17.22 | −0.12 | no | no | no | no |
| C. example 4 | 17.01 | 17.18 | −0.17 | no | no | no | yes |
| C. example 5 | 17.00 | 17.20 | −0.20 | no | no | no | yes |

*C. example: Comparative example
*E. example: Experimental example

As shown in the Table, in Experimental examples 1 to 9, no defects were generated from both the electrode tab and electrode plate after the drum test.

However, in Comparative examples 1 to 3, although no defect was generated from the electrode plate, a defect was observed from the electrode tab. Thus, as the gap between the inner wall of the can and the outer wall of the electrode assembly is increased, defects are more easily generated from the electrode tab. This is because the electrode assembly is more badly moved.

Further, in Comparative examples 4 and 5, although no defect was generated from the electrode tab, a defect was generated from the electrode plate. Thus, it can be noted that when the electrode assembly is very strongly pressed, the movement of the electrode assembly can be prevented, but the electrode plate can be damaged.

Therefore, when the gap between the inner wall of the can and the outer wall of the electrode assembly is very large, the electrode assembly can be badly moved, and thus the electrode tab may have a defect such as a crack, or a short circuit occurring at a contact portion. However, when the outer wall of the electrode assembly is very strongly pressed to prevent the movement of the electrode assembly, the electrode plate can be damaged.

In one embodiment, when the sum of both the gaps between the inner wall of the can on which the fixing part is formed and the outer wall of the electrode assembly ranges from about −0.12 mm to about 0.10 mm, the movement of the electrode assembly can be effectively prevented without the generation of defects on the electrode plate.

In one embodiment, a central axis of the electrode assembly is disposed in the middle of the can. However, the central axis of the electrode assembly may be disposed apart from the middle of the can, or the fixing parts may not face each other.

Figure 4:
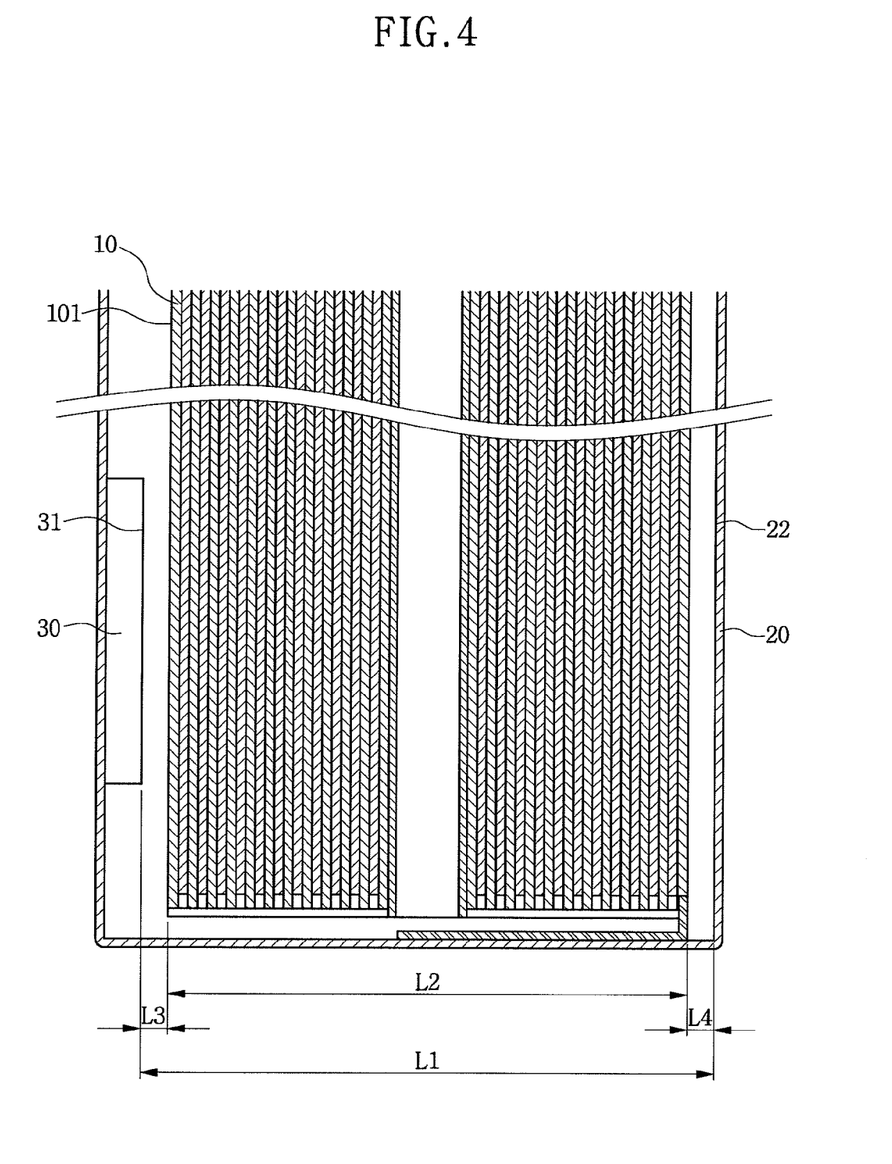
FIG. 4 is a cross-sectional view of a part of the secondary battery according to another exemplary embodiment of the present invention.

For example, referring to FIG. 4, in the cross-sectional view, the central axis of the electrode assembly is not disposed in the middle of the can, and one fixing part 30 is formed.

In this case, the gap L3 between the inner wall 31 of the fixing part 30 and the outer wall 101 of the electrode assembly 10 may be different from the gap L4 between the inner wall 22 of the can 20 on which the fixing part is not formed and the outer wall 101 of the electrode assembly 10. However, the sum (L3+L4) of the gap L3 between the inner wall 31 of the fixing part 30 in the can 20 and the outer wall 101 of the electrode assembly 10 and the gap L4 between the inner wall 22 of the can 20 and the outer wall 101 of the electrode assembly 10 may range from about −0.12 mm to about 0.10 mm.

In one embodiment, the fixing parts may or may not face each other.

In the cross-sectional view, when the fixing parts face each other, the sum of the gaps (L3 and L4 of FIG. 3) between the inner wall of the can on which the fixing parts are disposed (the inner walls of the fixing parts 30) and the outer wall 101 of the electrode assembly 10 may be in the range of about −0.12 mm to about 0.10 mm. In one embodiment, when the fixing parts do not face each other, if the sum of i) the gap (L3 of FIG. 4) between the inner wall of the can on which the fixing part is disposed (the inner wall of the fixing part 30) and the outer wall of the electrode assembly 10 and ii) the gap (L4 of FIG. 4) between the inner wall 22 of the can 20 on which the fixing part is not disposed and the outer wall 101 of the electrode assembly 10 may be in the range of about −0.12 mm to about 0.10 mm.

In one embodiment, to effectively prevent the movement of the electrode assembly 10, as shown in FIGS. 2 to 4, one or more fixing parts 30 may be formed in a length direction of the can 20, and each may have a polygonal cross-section.

Figure 5A:
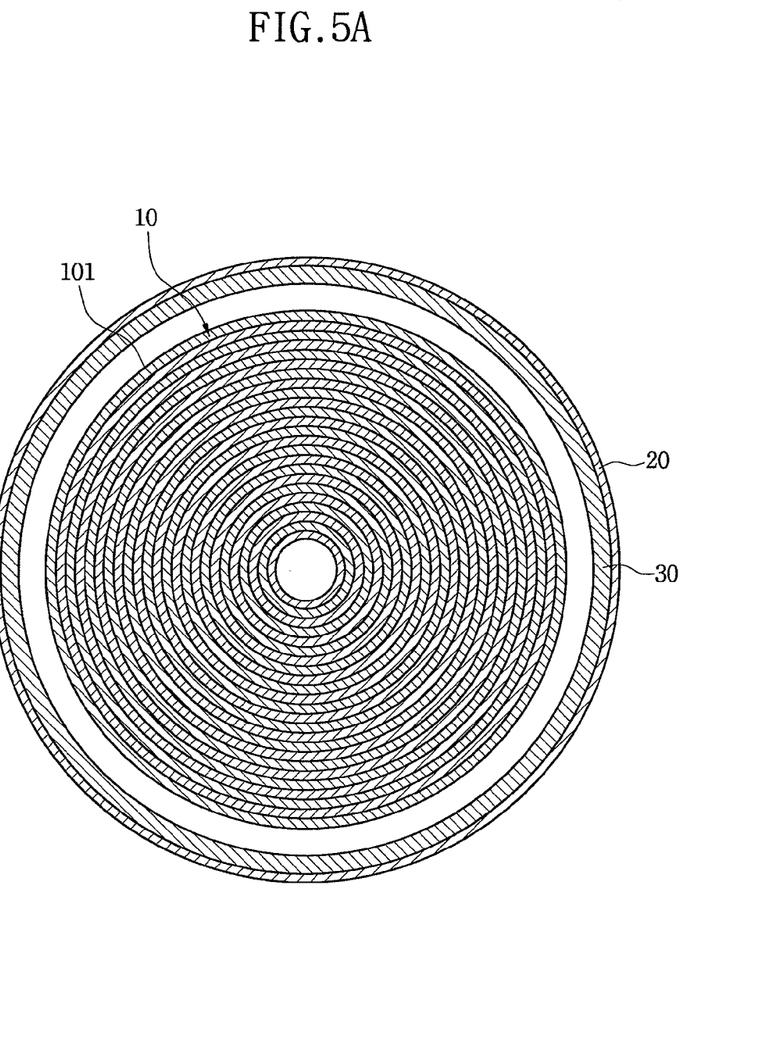
FIGS. 5A to 5F are plan and cross-sectional views of various fixing parts according to another exemplary embodiment of the present invention.
Figure 5B:
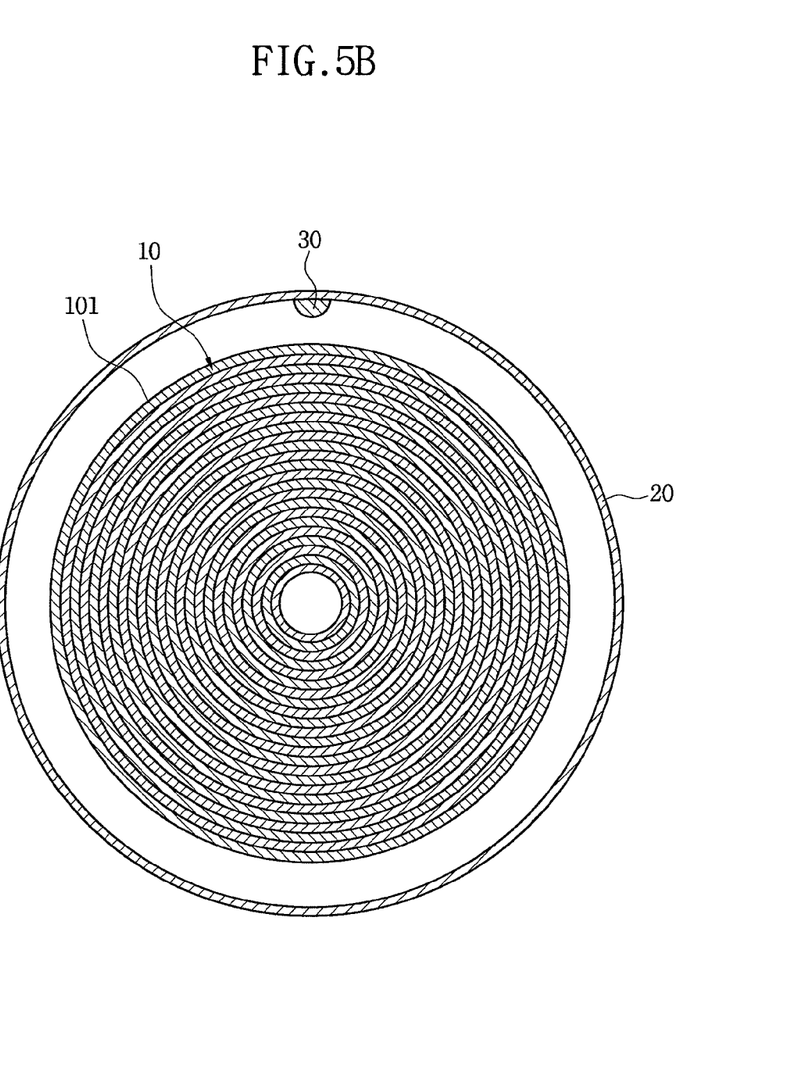

Alternatively, one or more fixing parts 30 may be substantially continuously formed along a circumference of the can 20 as shown in FIG. 5A, and each may have a semi-circular cross-section as shown in FIG. 5B.

Figure 5C:
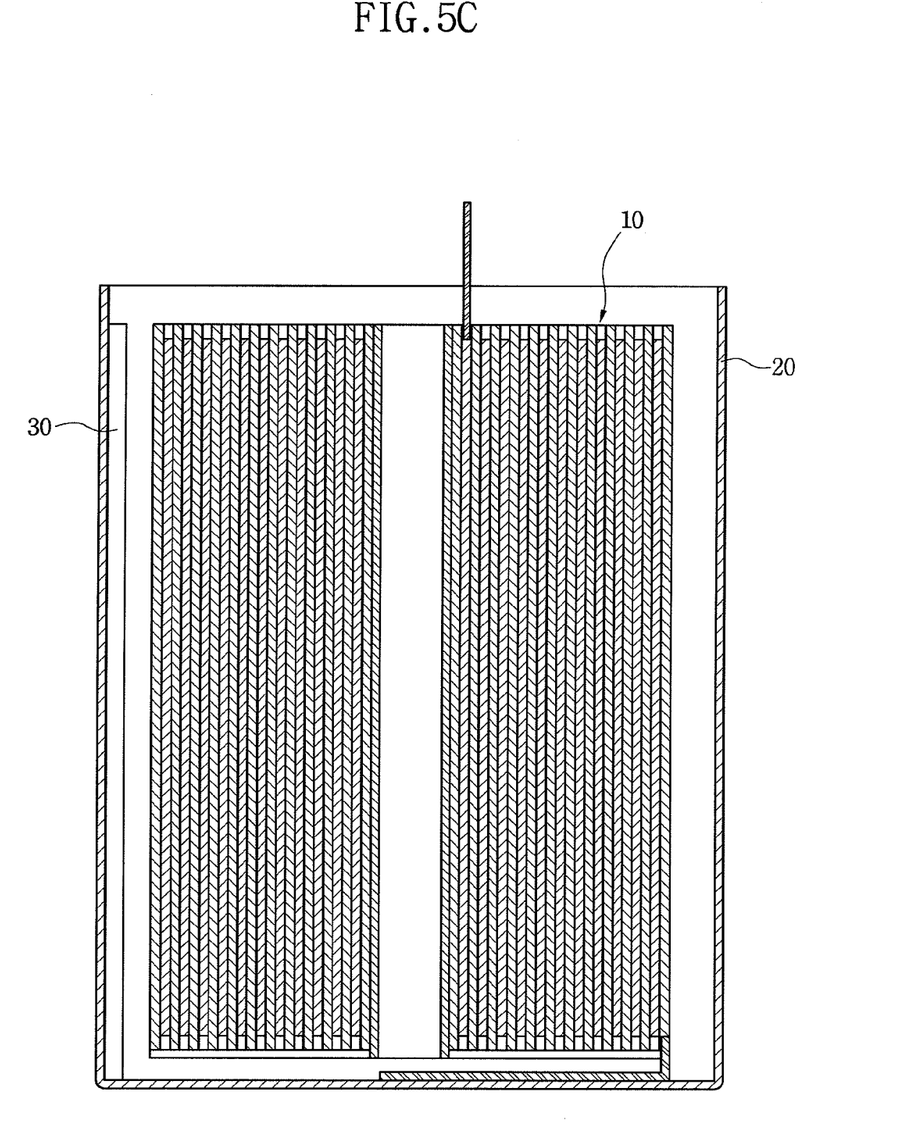

In one embodiment, the fixing part 30 may have the same length as the electrode assembly 10 to correspond to an outer wall of the electrode assembly 10, or may be longer than the electrode assembly 10 as shown in FIG. 5C.

Figure 5D:
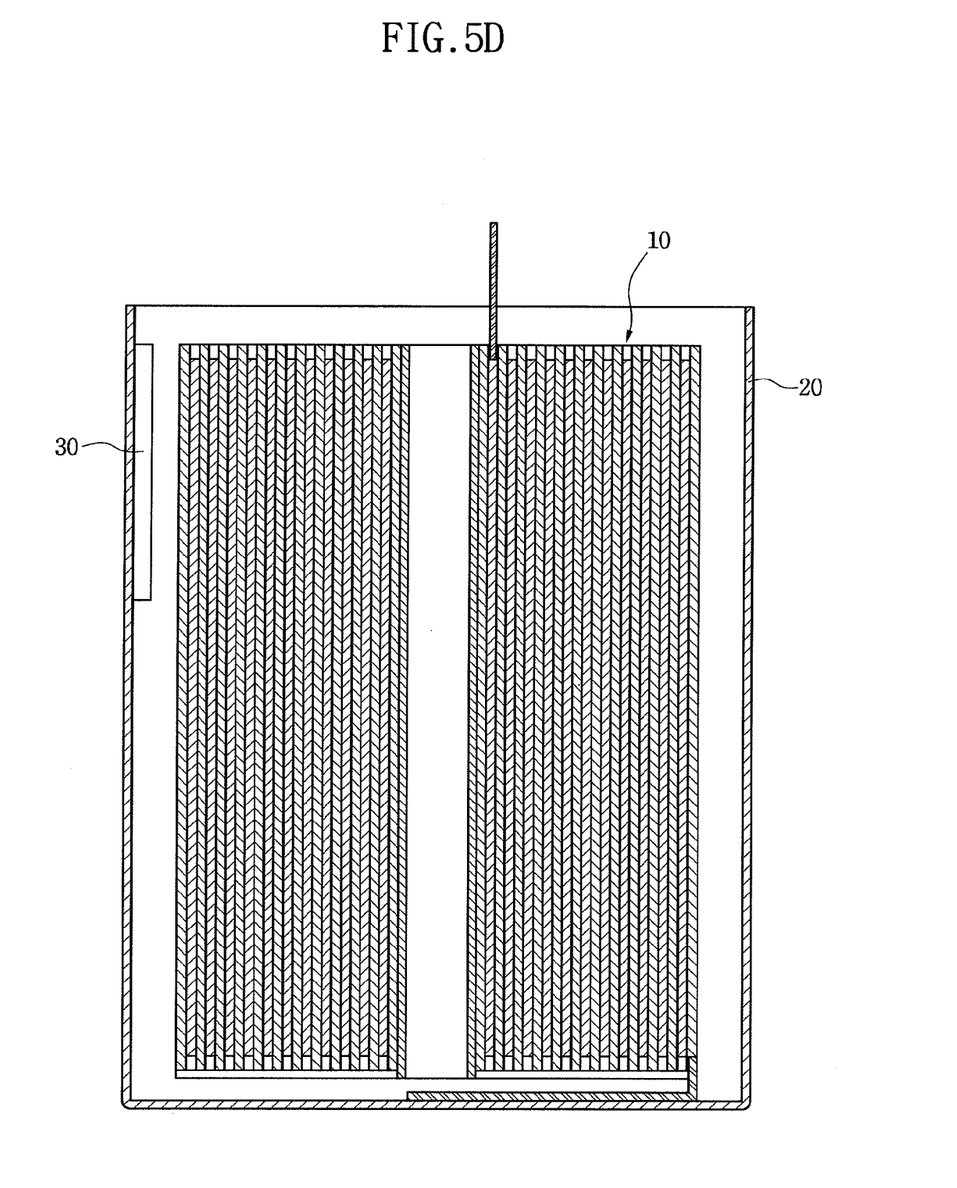
Figure 5E:
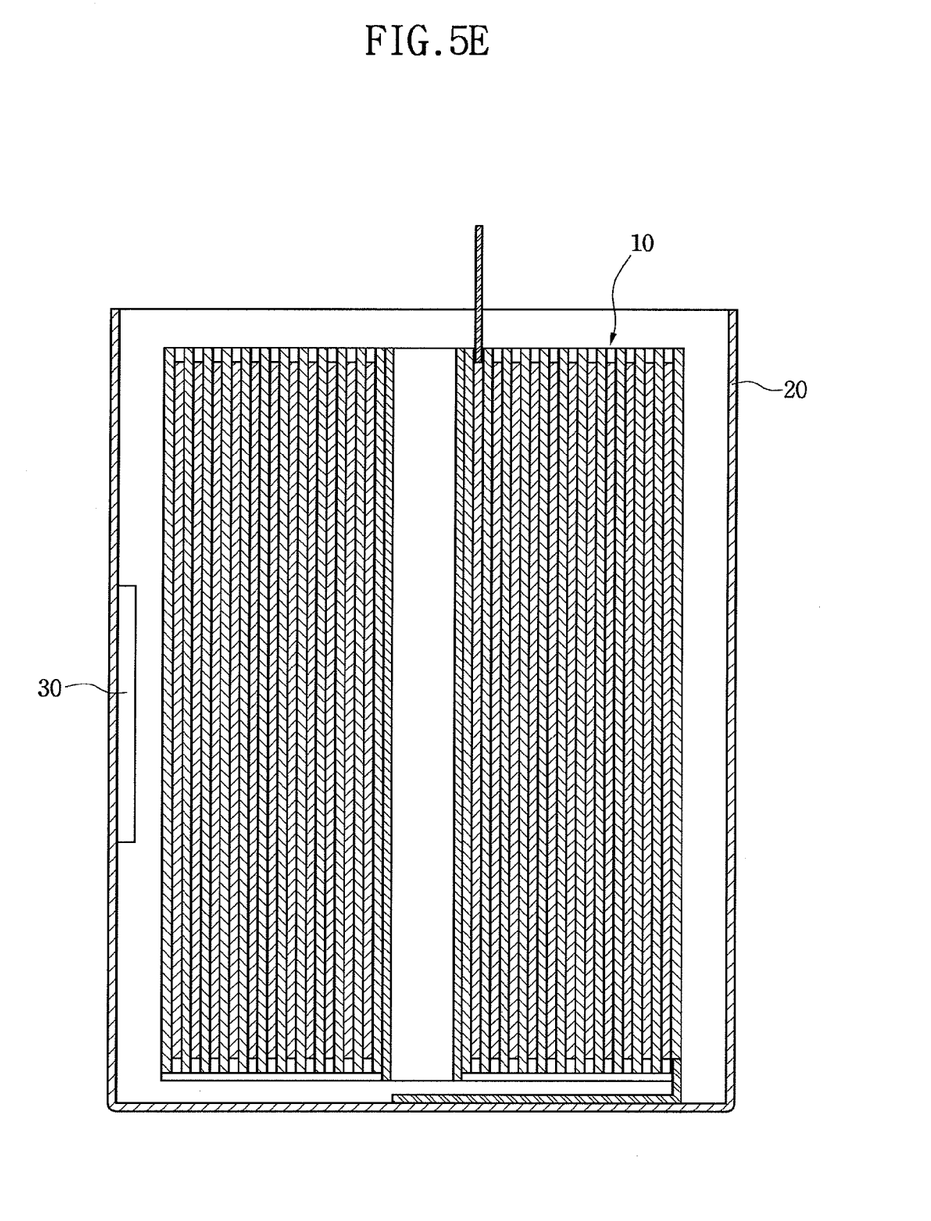
Figure 5F:
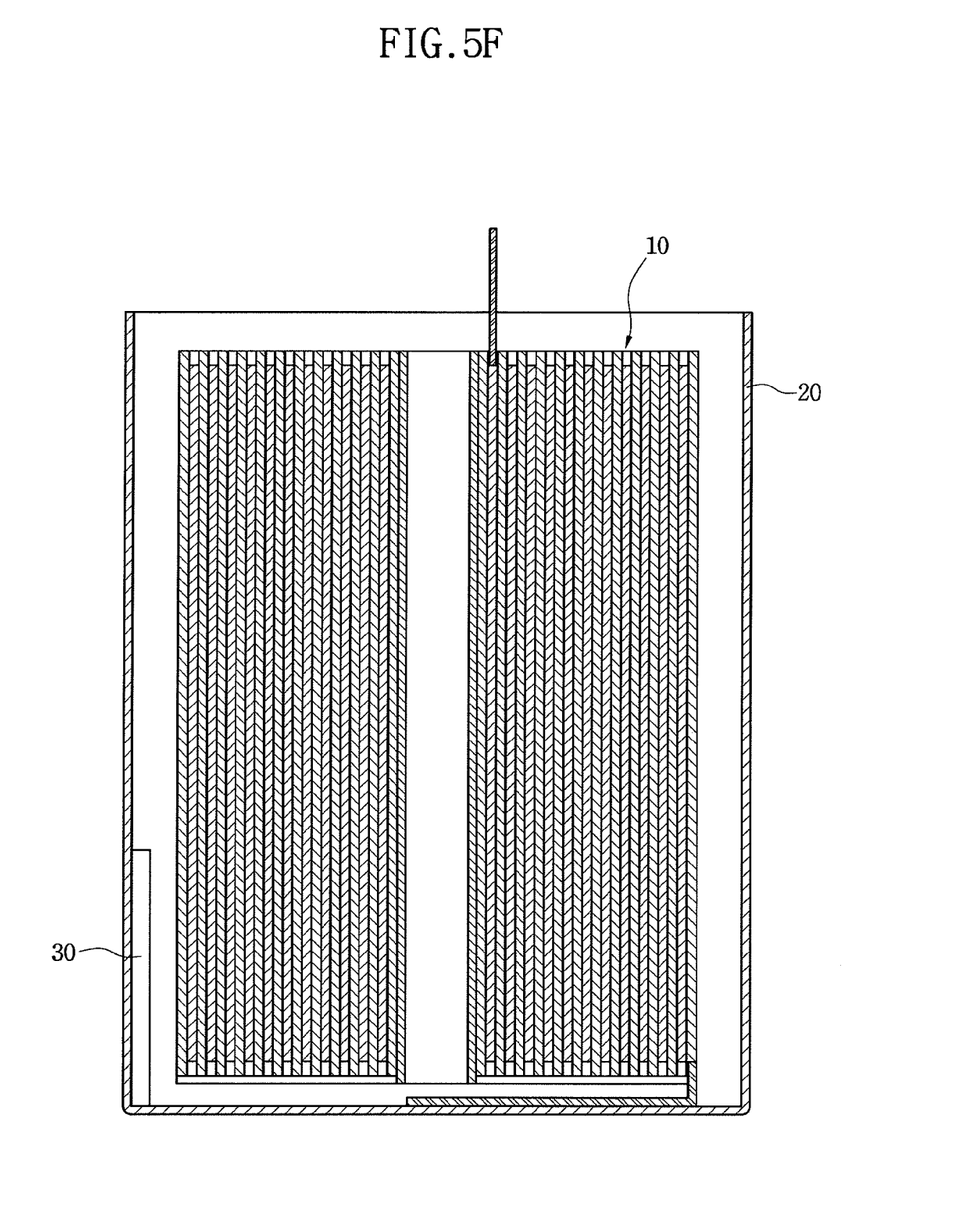

As shown in FIGS. 5D to 5F, the fixing part 30 may be formed on the inner wall of the can 20 so as to correspond to one of upper, middle and lower portions of the electrode assembly 10, or may formed to correspond to at least two different portions.

For example, the fixing part 30 may be formed to correspond to at least one of upper, middle and lower portions of the electrode assembly 10.

At least one embodiment of the present invention can effectively prevent movement of an electrode assembly without causing a defect on an electrode plate, and thus safety of a battery can be improved.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
an electrode assembly having a diameter of L2;
a can housing the electrode assembly and having a top and a bottom; and
at least one fixing part extending from an inner wall of the can toward an outer surface of the electrode assembly,
wherein L1 is defined as the shortest distance between two portions of the inner wall of the can which are directly opposing with respect to each other,
wherein the fixing part does not contact the outer surface of the electrode assembly,
wherein the electrode assembly is separated from the fixing part by a gap such that the electrode assembly is prevented from contacting the can, and
wherein the electrode assembly has a first height measured in a first direction from the bottom of the can to the top of the can, wherein the fixing part has a second height measured in the first direction, and wherein the second height is equal to or greater than the first height.

2. The secondary battery according to claim 1, wherein the fixing part is integrally formed into the inner wall of the can or is a separate component attached to the inner wall of the can.

3. The secondary battery according to claim 1, wherein the fixing part is formed of a metal or rubber.

4. The secondary battery according to claim 1, wherein the fixing part is continuously formed along a circumference of the can.

5. The secondary battery according to claim 1, wherein the fixing part has a polygonal or semi-circular cross-section.

6. The secondary battery according to claim 1, wherein the fixing part comprises at least one pair of sub-fixing portions directly opposing each other, and wherein the shortest distance (L1) is defined as the distance between the pair of sub-fixing portions.

7. The secondary battery according to claim 1, wherein the fixing part comprises first and second pairs of sub-fixing portions, wherein the first pair of sub-fixing portions are directly opposing with respect to each other, wherein the second pair of sub-fixing portions are directly opposing with respect to each other, and wherein the distance between the first pair of sub-fixing portions is different from the distance between the second pair of sub-fixing portions.

8. The secondary battery according to claim 1, wherein the fixing part is one in number, and wherein the shortest distance (L1) is defined as the distance between the fixing part and the portion of the inner wall which is directly opposing the one fixing part.

9. A secondary battery comprising:
   an electrode assembly comprising an outer surface, wherein the electrode assembly has a diameter of L2;
   a can housing the electrode assembly and having a top and a bottom, wherein the can comprises an inner wall facing the outer surface of the electrode assembly; and
   at least one protrusion extending from the inner wall of the can toward the outer surface of the electrode assembly, wherein the protrusion comprises i) a bottom portion contacting the inner wall of the can and ii) a top portion which faces and is closer to the outer surface of the electrode assembly than the bottom portion,
   wherein L1 is defined as the shortest distance between two portions of the inner wall of the can which are directly opposing with respect to each other, wherein the protrusion does not contact the outer surface of the electrode assembly, wherein the electrode assembly is separated from the protrusion by a gap such that the electrode assembly is prevented from contacting the can,
   wherein the electrode assembly has a first height measured in a first direction from the bottom of the can to the top of the can, wherein the protrusion has a second height measured in the first direction, and wherein the second height is equal to or greater than the first height.

10. The secondary battery according to claim 9, wherein the protrusion comprises a pair of sub-protrusions which are directly opposing with respect to each other, wherein L3 is defined as the shortest distance between the outer surface of the electrode assembly and the top portion of one of the two sub-protrusions, wherein L4 is defined as the shortest distance between the outer surface of the electrode assembly and the top portion of the other sub-protrusion, and wherein the sum of L3 and L4 is in the range from about 0.02 mm to about 0.10 mm.

11. The secondary battery according to claim 9, wherein the protrusion is one in number, wherein L3 is defined as the shortest distance between the outer surface of the electrode assembly and the top portion of the one protrusion, wherein L4 is defined as the shortest distance between the outer surface of the electrode assembly and the portion of the inner wall of the can which is directly opposing the one protrusion, and wherein the sum of L3 and L4 is in the range from about 0.02 mm to about 0.10 mm.

12. The secondary battery according to claim 9, wherein the protrusion is continuously formed along a circumference of the can.

13. The secondary battery according to claim 9, wherein the protrusion is formed of a metal or rubber.

14. The secondary battery according to claim 9, wherein the protrusion has a polygonal or semi-circular cross-section.

15. The secondary battery according to claim 9, wherein the protrusion is integrally formed into the inner wall of the can or is a separate component attached to the inner wall of the can.

16. The secondary battery according to claim 9, wherein the protrusion comprises first and second pairs of sub-protrusions, wherein the first pair of sub-protrusions are directly opposing with respect to each other, wherein the second pair of sub-protrusions are directly opposing with respect to each other, and wherein the distance between the first pair of sub-protrusions is different from the distance between the second pair of sub-protrusions.

* * * * *